United States Patent
Kodama et al.

(10) Patent No.: US 10,291,918 B2
(45) Date of Patent: May 14, 2019

(54) IMAGE COMPRESSION APPARATUS, IMAGE EXPANSION APPARATUS, AND IMAGE TRANSFER SYSTEM

(71) Applicant: KABUSHIKI KAISHA TOSHIBA, Minato-Ku, Tokyo (JP)

(72) Inventors: Sho Kodama, Kawasaki Kanagawa (JP); Keiri Nakanishi, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 306 days.

(21) Appl. No.: 15/061,956

(22) Filed: Mar. 4, 2016

(65) Prior Publication Data

US 2017/0064318 A1    Mar. 2, 2017

(30) Foreign Application Priority Data

Sep. 2, 2015    (JP) ................. 2015-173113

(51) Int. Cl.
| | |
|---|---|
| *H04N 7/12* | (2006.01) |
| *H04N 19/136* | (2014.01) |
| *H04N 19/105* | (2014.01) |
| *H04N 19/186* | (2014.01) |

(52) U.S. Cl.
CPC ......... *H04N 19/136* (2014.11); *H04N 19/105* (2014.11); *H04N 19/186* (2014.11)

(58) Field of Classification Search
CPC ... H04N 19/136; H04N 19/105; H04N 19/186
USPC .................................................. 375/240.08
See application file for complete search history.

(56) References Cited

U.S. PATENT DOCUMENTS

| | | |
|---|---|---|
| 6,757,429 B2 | 6/2004 | Hu |
| 8,351,721 B2 | 1/2013 | Katou et al. |
| 2014/0096159 A1* | 4/2014 | Rowe ................... G11B 27/031 725/43 |

(Continued)

FOREIGN PATENT DOCUMENTS

| | | |
|---|---|---|
| JP | 2011124846 A | 6/2011 |
| JP | 2013106302 A | 5/2013 |
| JP | 5227989 B2 | 7/2013 |

OTHER PUBLICATIONS

Syung, et al., "Block Adaptive Inter-Color Compensation Algorithm for RGB 4:4:4 Video Coding", IEEE Transactions on Circuits and Systems for Video Technology, IEEE, Sep. 26, 2008, vol. 18, No. 10, pp. 1447-1451.

(Continued)

*Primary Examiner* — Allen C Wong
(74) *Attorney, Agent, or Firm* — Holtz, Holtz & Volek PC (57) ABSTRACT

An image compression apparatus according to an embodiment includes a slope determiner and a compressor. The slope determiner determines slopes of linear lines calculated from a reference component and non-reference components. The reference component is one of a plurality of image components forming pixels included in an input image data. The non-reference components are other image components. The compressor generates a compressed image data in which a value of the reference component of each of the pixels in the input image data, the slopes, and representative values of the non-reference components are compressed.

17 Claims, 3 Drawing Sheets

(56) References Cited

U.S. PATENT DOCUMENTS

2016/0360213 A1* 12/2016 Lee ..................... H04N 19/186

OTHER PUBLICATIONS

Byung, et al., Block Adaptive Inter-Color Compensation Algorithm for RGB 4:4:4 Video Coding, IEEE Transactions on Circuits and Systems for Video Technology, IEEE, Sep. 26, 2008, vol. 18, No. 10, pp. 1447-1451.

* cited by examiner

IMAGE COMPRESSION APPARATUS, IMAGE EXPANSION APPARATUS, AND IMAGE TRANSFER SYSTEM

CROSS REFERENCE TO RELATED APPLICATIONS

This application is based upon and claims the benefit of priority from the prior Japanese Patent Application No. 2015-173113, filed on Sep. 2, 2015, the entire contents of which are incorporated herein by reference.

FIELD

Embodiments relate to an image compression apparatus, an image expansion apparatus, and an image transfer system.

BACKGROUND

In an image including pixels each formed by a plurality of components, a correlation (a correlative relation) among the components is high (strong) in some cases. When an image including pixels having a high correlation among the components is to be compressed, it may be possible to perform efficient compression by using one component for approximation of other components.

Inter-color-component prediction is known as image compression (coding) based on the correlation among components. In this image compression, the components are classified into a reference component and non-reference components. The reference component is coded (compressed) with a variable length code. The non-reference components are each predicted with a primary equation (a linear equation) using the reference component, so that a slope and an intercept (a prediction coefficient) of the linear equation are coded. In this image compression, reduction in the code amount required for compression of the non-reference components is achieved by compressing the slopes and the intercepts of the linear equations instead of compressing the non-reference components themselves.

However, compression of the slopes and the intercepts of the linear equations requires a large code amount for some correlations among the components.

DETAILED DESCRIPTION

An image compression apparatus according to an embodiment includes a slope determiner and a compressor. The slope determiner determines slopes of linear lines calculated from a reference component and non-reference components. The reference component is one of a plurality of image components forming pixels included in an input image data. The non-reference components are other image components. The compressor generates a compressed image data in which a value of the reference component of each of the pixels in the input image data, the slopes, and representative values of the non-reference components are compressed.

Embodiments are hereinafter explained with reference to the accompanying drawings. While characteristic configurations and operations of an image transfer system are mainly explained in the following embodiments, the image transfer system may include configurations and operations omitted in the following explanations. The omitted configurations and operations are also included in the scope of the embodiments.

Figure 1:
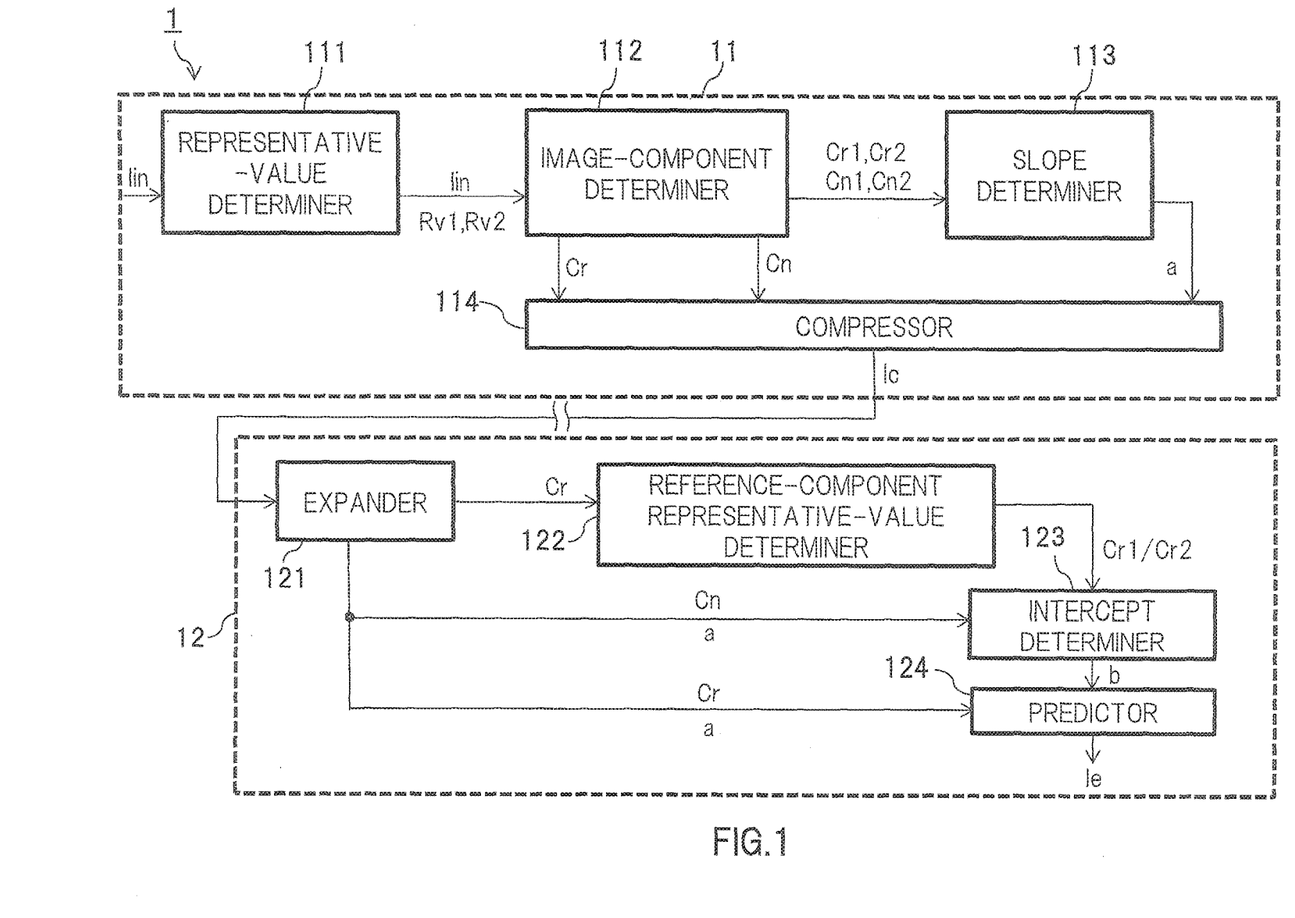
FIG. 1 is a block diagram showing an image transfer system according to an embodiment.

FIG. 1 is a block diagram showing an image transfer system 1 according to an embodiment. The image transfer system 1 can be mounted on a semiconductor integrated circuit (a chip) having an image interface function, for example.

The image transfer system 1 includes an image compression apparatus 11 and an image expansion apparatus 12. The image compression apparatus 11 performs compression (coding or compression coding) for an input image data Iin to generate a compressed image data Ic. The image expansion apparatus 12 expands (decodes) the compressed image data Ic to generate an expanded image Ie.

The input image data Iin is a pixel block including a predetermined number of pixels. For example, the pixel block has an 8-bit YUV format including eight pixels in a horizontal direction and one pixel in a vertical direction that are input in raster order.

Each pixel has a plurality of image components. For example, the image components are components such as Y, U, and V components, a color component, and a pixel component. In successive pixels, the image components have a correlation represented by a linear equation (a linear line) established therebetween. A different linear equation is established in every pixel block. That is, the relation between two image components can be represented by the linear equation. For example, the U component can be represented using the Y component, a slope "a", and an intercept b as $U=aY+b$. Using this linear equation enables prediction of an image component from another image component. The image transfer system 1 uses the correlation established between the image components to compress the input image data and expand the compressed image data (predict the input image data). An input image data being a pixel block having the 8-bit YUV format (eight pixels in the horizontal direction and one pixel in the vertical direction) is described below as a specific example.

(Image Compression Apparatus 11)

The image compression apparatus 11 includes a representative-value determiner 111, an image-component determiner 112, a slope determiner 113, and a compressor 114.

(Representative-Value Determiner 111)

The input image data Iin is input to the representative-value determiner 111 from a higher-level device (not shown). The representative-value determiner 111 determines two representative values Rv1 and Rv2 based on the image components of each pixel. The representative values Rv1 and Rv2 are parameters for determination of the reference component, the non-reference components, and the slope "a" of the linear line. The representative-value determiner 111 outputs the determined representative values Rv1 and Rv2 to the image-component determiner 112 together with the input image data Iin.

Specifically, the representative-value determiner 111 determines an average value of a predetermined number of pixels having smaller values of an image component as a smaller representative value (a first representative value Rv1). The representative-value determiner 111 also determines an average value of a predetermined number of pixels having larger values of the image component as a larger representative value (a second representative value Rv2).

For example, the representative-value determiner 111 sorts eight pixels in ascending order based on values of the Y component. The representative-value determiner 111 then calculates average values of the respective image components Y, U, and V of top (first) n (for example, n=4) pixels of the sorted eight pixels to obtain the first representative value Rv1 (Yr1, Ur1, Vr1). The representative-value determiner 111 also calculates average values of the respective image components Y, U, and V of bottom (last) (8−n) pixels to obtain the second representative value Rv2 (Yr2, Ur2, Vr2). That is, in a case where the pixels are sorted in ascending order based on the values of the Y component, the average values of the respective U and V components are obtained in accordance with the order of the Y component.

How to determine the representative values is not limited to the above. For example, a pixel having an obviously different tendency of increase/decrease of the values of the Y and U components may be regarded as an outlier that is not considered in the determination of the representative values.

(Image-Component Determiner 112)

The image-component determiner 112 determines the reference component and the non-reference components. The reference component is an image component used as a reference in prediction between the image components. The non-reference components are image components other than the reference component. In other words, the reference component is the image component from which other image components are to be predicted. The non-reference components are the image components to be predicted.

Specifically, the image-component determiner 112 obtains a differential absolute value between the first and second representative values for each of the image components and compares the differences between the representative values of the respective image components with one another. The image-component determiner 112 then determines an image component having the largest difference as the reference component and other image components as the non-reference components. This determination can reduce the slope (the range of the slope) of the linear line calculated by the slope determiner 113.

The differential absolute values of the respective image components are |Yr1−Yr2|, |Ur1−Ur2|, and |Vr1−Vr2|. The image-component determiner 112 compares magnitudes of the differential absolute values of the respective image components. In a case where |Yr1−Yr2| is the largest, the image-component determiner 112 determines the Y component as the reference component and the U and V components as the non-reference components. In a case where |Ur1−Ur2| is the largest, the image-component determiner 112 determines the U component as the reference component and the Y and V components as the non-reference components. In a case where |Vr1−Vr2| is the largest, the image-component determiner 112 determines the V component as the reference component and the Y and U components as the non-reference components.

The image-component determiner 112 outputs a value Cr of the reference component and one representative value Cn of each of the non-reference components (that is, a first or second representative value Cn1 or Cn2) to the compressor 114. The image-component determiner 112 also outputs first and second representative values Cr1 and Cr2 of the reference component and the first and the second representative values Cn1 and Cn2 of each of the non-reference components to the slope determiner 113. For example, the image-component determiner 112 outputs values of the Y components of the eight pixels and either the first representative values (Ur1, Vr1) of the U and V components or the second representative values (Ur2, Vr2) thereof to the compressor 114. The image-component determiner 112 also outputs first and second representative values Yr1 and Yr2 of the Y component and the first and the second representative values (Ur1, Ur2) and (Vr1, Vr2) of the U and V components to the slope determiner 113.

(Slope Determiner 113)

The slope determiner 113 determines the slope "a" of the linear line for predicting each of the non-reference components from the reference component (hereinafter, simply "slope a"). The slope determiner 113 obtains a value by performing arithmetic shift for the difference in each of the non-reference components and divides the value by the difference in the reference component to determine the resultant value as the slope "a". The arithmetic shift is left shift, for example.

It is assumed that the reference component is the Y component and the non-reference components are the U and V components, for example. In a case of predicting the U component using the Y component, the slope determiner 113 determines a slope $a_{U(Y)}$ based on Equation (1). In a case of predicting the V component using the Y component, the slope determiner 113 determines a slope $a_{V(Y)}$ based on Equation (2).

The following equations correspond to a case where the slopes are negative.

$$a_{U(Y)} = ((Ur1-Ur2) << \text{ScaleShift})/(Yr1-Yr2) \quad (1)$$

$$a_{V(Y)} = ((Vr1-Vr2) << \text{ScaleShift})/(Yr1-Yr2) \quad (2)$$

(Ur1−Ur2)<<ScaleShift that is the numerator of Equation (1) is a value having increased digits as a result of the left shift of (Ur1−Ur2). Similarly, (Vr1−Vr2)<<ScaleShift that is the numerator of Equation (2) is a value having increased digits as a result of the left shift of (Vr1−Vr2). Equations (1) and (2) are integer arithmetics. The slope determiner 113 can simply calculate the slopes by performing the integer arithmetic. The slope determiner 113 may determine the slopes with high accuracy by using floating point.

In this case, in Equations (1) and (2), the difference (Yr1−Yr2) of the reference component Y is larger than or equal to the difference (Ur1−Ur2) of the non-reference component U and the difference (Vr1−Vr2) of the non-reference component V. The relation of magnitude is the same after the left shift is performed for (Ur1−Ur2) and (Vr1−Vr2). Therefore, $a_{U(Y)}$ and $a_{V(Y)}$ are equal to or less than 1 because they are values obtained by dividing numerators by denominators larger than or equal to the numerators, respectively. Because the slope determiner 113 can determine the slopes within a range of 1 or less, it is possible to suppress the code amount used in compression of the slopes in the compressor 114.

(Compressor 114)

The compressor 114 generates the compressed image data Ic in which the value Cr of the reference component of each pixel in the input image data Iin, the slope "a", and the representative values Cn of the non-reference components are compressed. The compressor 114 outputs the generated compressed image data Ic (a compressed stream) to the image expansion apparatus 12, for example.

The representative value of a non-reference component compressed by the compressor 114 may be the first representative value Cn1 or the second representative value Cn2. In a case where there are a plurality of non-reference components, the representative value of each of the non-reference components may be the first representative value or the second representative value for the non-reference component. The slope "a" may also be a slope determined for each of the non-reference components.

Determination of the slope "a" and one point suffices for representation of a non-reference component with a linear line. Due to compression, the compressor 114 can provide all information enabling the non-reference components to be represented (predicted or reproduced) to the image expansion apparatus 12 with a smaller information amount. The representative value Cn of each of the non-reference components and the representative value (Cr1 or Cr2) of the reference component can represent one point through which the corresponding linear line passes.

If the intercept is to be compressed without reducing the slope of the linear line, the possible value of the intercept is increased. Therefore the compression of the intercept requires a larger code amount. For example, 16 bits code amount per component is required for the compression of the intercept. In contrast, in the present embodiment, the representative values Cn of the non-reference components that have a smaller information amount than the intercept is compressed instead of the intercept. Furthermore, the range of the slope of the linear line is set to be equal or smaller than 1. Therefore, the code amount required for compression can be reduced. For example, the code amount required for the compression can be reduced to 8 bits per component. Further, the value Cr of the reference component is compressed as it is. This enables a better image quality to be ensured as compared with a case of compressing an intra-predicted image.

The compressor 114 may perform coding with a fixed length code. The coding with the fixed length code can surely prevent the code amount from being excessively large as compared with a case of coding with a variable length code.

(Image Expansion Apparatus 12)

The image expansion apparatus 12 includes an expander 121, a reference-component representative-value determiner 122, an intercept determiner 123, and a predictor 124.

(Expander 121)

The compressed image data Ic from the image compression apparatus 11 is input to the expander 121. The expander 121 expands the compressed image data Ic to acquire the value Cr of the reference component of each of the pixels in the input image data, the slope "a", and the representative value Cn of each of the non-reference components. The expansion may be unpacking. The expander 121 outputs the value Cr of the reference component to the reference-component representative-value determiner 122. The expander 121 also outputs the slope "a" and the representative values Cn of each of the non-reference components to the intercept determiner 123. The expander 121 also outputs the value Cr of the reference component and the slope "a" to the predictor 124.

(Reference-Component Representative-Value Determiner 122)

The reference-component representative-value determiner 122 determines one representative value (Cr1 or Cr2) of the reference component based on the values Cr of the respective reference components of the pixels, and outputs the determined representative value to the intercept determiner 123.

In a case where the image compression apparatus 11 is configured to compress the first representative value Cn1 of each of the non-reference components and the slope "a" is positive, the reference-component representative-value determiner 122 determines the first representative value Cr1 as the representative value of the reference component. For example, the reference-component representative-value determiner 122 determines an average value of the reference component of a predetermined number of pixels counted from a pixel having the smallest value of the reference component, as the first representative value Cr1. On the other hand, in a case where the slope "a" is negative, the reference-component representative-value determiner 122 determines the second representative value Cr2 as the representative value of the reference component. For example, the reference-component representative-value determiner 122 determines an average value of the reference component of a predetermined number of pixels counted from a pixel having the largest value of the reference component, as the second representative value Cr2.

Meanwhile, in a case where the image compression apparatus 11 is configured to compress the second representative value Cn2 of each of the non-reference components and the slope "a" is positive, the reference-component representative-value determiner 122 determines the second representative value Cr2 as the representative value of the reference component. For example, the reference-component representative-value determiner 122 determines the average value of the reference component of the predetermined number of pixels counted from the pixel having the largest value of the reference component, as the second representative value Cr2. On the other hand, in a case where the slope "a" is negative, the reference-component representative-value determiner 122 determines the first representative value Cr1 as the representative value of the reference component. For example, the reference-component representative-value determiner 122 determines the average value of the reference component of the predetermined number of pixels counted from the pixel having the smallest value of the reference component, as the first representative value Cr1.

A combination of the representative value Cn of each of the non-reference components acquired from the compressed image data Ic and the representative value (Cr1 or Cr2) of the reference component determined by the reference-component representative-value determiner 122 represents one point through which the corresponding linear line passes. That is, it is possible to accurately define the linear line by determining the first representative value Cr1 of the reference component with respect to the first representative value Cn1 of each of the non-reference components or determining the second representative value Cr2 of the reference component with respect to the second representative value Cn2 of each of the non-reference components.

(Intercept Determiner 123)

The intercept determiner 123 determines the intercept b of the linear line based on the slope "a", the representative value Cn of each of the non-reference components, and the representative value (Cr1 or Cr2) of the reference component. The intercept determiner 123 outputs the determined intercept b (intercept data) to the predictor 124.

For example, the intercept determiner 123 determines an intercept $b_{U(Y)}$ that predicts the U component (the non-reference component) using the Y component (the reference component) based on Equation (3). The intercept determiner 123 also determines an intercept $b_{V(Y)}$ that predicts the V component (the non-reference component) using the Y component (the reference component) based on Equation (4).

$$b_{U(Y)} = Ur1 - a_{U(Y)} Yr1 \quad (3)$$

$$b_{V(Y)} = Vr1 - a_{V(Y)} Yr1 \quad (4)$$

In Equation (3), the representative value Ur1 of the U component and the representative value Yr1 of the Y component corresponding to Ur1 can be replaced with the representative value Ur2 and the representative value Yr2, respectively. Also in Equation (4), the representative value Vr1 of the V component and the representative value Yr1 of the Y component corresponding to Vr1 can be replaced with the representative value Vr2 and the representative value Yr2, respectively.

(Predictor 124)

The predictor 124 predicts the respective values of the non-reference components of each pixel based on the value Cr of the reference component of each pixel, the slope "a", and the intercept b. The prediction may be inter-color-component prediction. The predictor 124 outputs the predicted non-reference components together with the reference component as the expanded image Ie (a YUV image, for example).

For example, the predictor 124 predicts the U component and the V component based on Equations (5) and (6), respectively.

$$U = a_{U(Y)} Y + b_{U(Y)} \quad (5)$$

$$V = a_{V(Y)} Y + b_{V(Y)} \quad (6)$$

(Operation Example)

Figure 2:
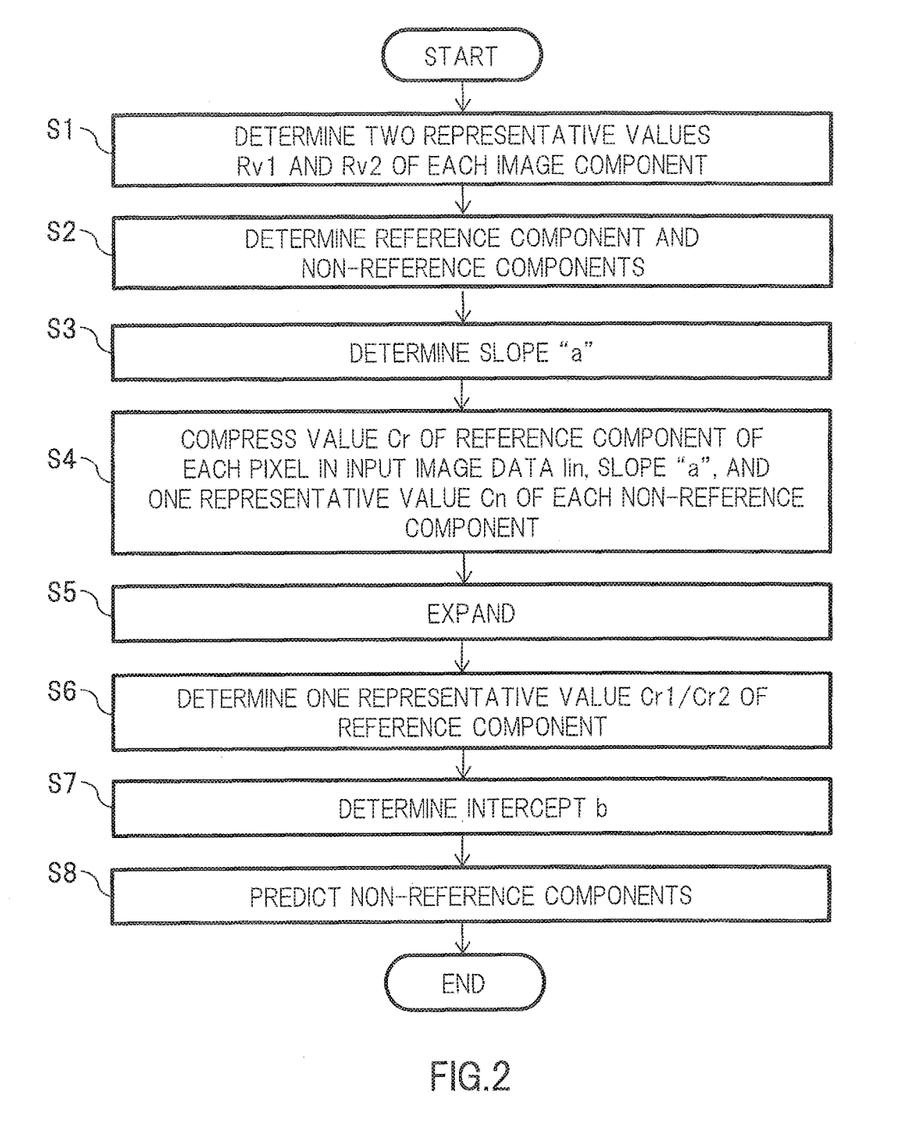
FIG. 2 is a flowchart showing an operation example of the image transfer system of FIG. 1.

An operation example of the image transfer system 1 is described next. FIG. 2 is a flowchart showing an operation example of the image transfer system of FIG. 1. First, the representative-value determiner 111 determines two representative values Rv1 and Rv2 of each image component based on values of each image component of respective pixels in an input image data Iin (S1).

Figure 3A:
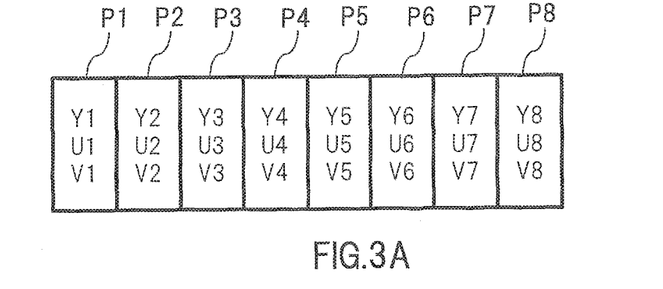
FIGS. 3A and 3B show an operation example of the image transfer system of FIG. 1.
Figure 3B:
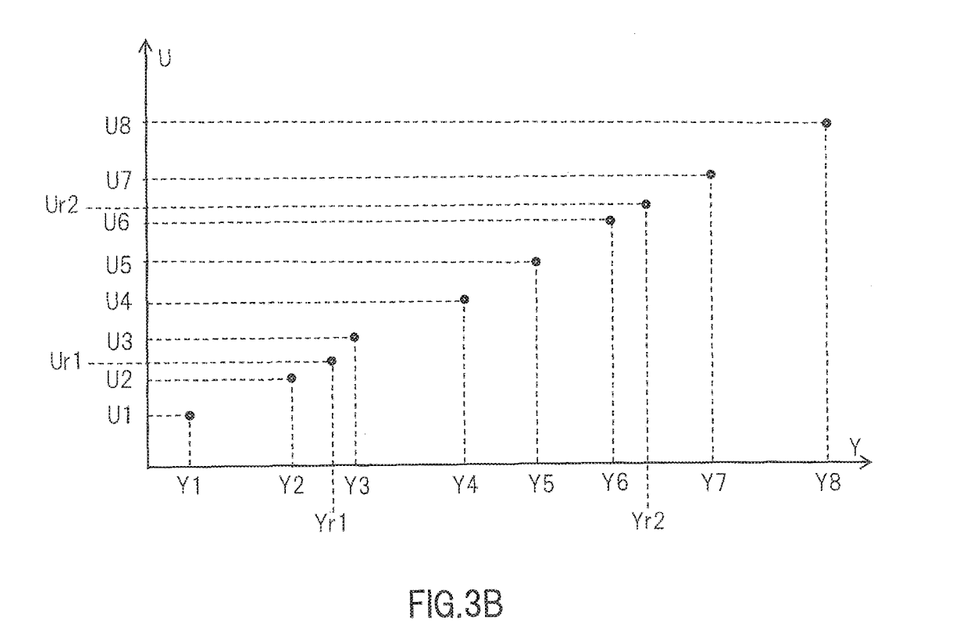

FIGS. 3A and 3B show an operation example of the image transfer system 1. Specifically, FIG. 3A shows pixels in an input image data sorted in ascending order based on pixel values of the Y component. That is, Y1<Y2<Y3<Y4<Y5<Y6<Y7<Y8. FIG. 3B is a graph showing how to determine the two representative values based on the sort result of FIG. 3A.

For example, the representative-value determiner 111 sorts pixels P1 (Y1, U1, V1) to P8 (Y8, U8, V8) in an input image data having an 8-bit YUV format based on pixel values of the Y component in ascending order.

FIG. 3B shows a correspondence relation between the Y and U components. A linear (proportional) relation is found between the Y component values and the U component values in the pixels P1 to P8. This means that the U components can be represented by a linear line using the Y components and the Y components can be represented by a linear line using the U components. One of the Y and U components is regarded as a reference component and the other is regarded as a non-reference component in order to use a linear line having a smaller code amount required for compression, that is, having a smaller slope.

The representative-value determiner 111 determines representative values of the Y, U, and V components. For example, the representative-value determiner 111 determines an average value $(Y1+Y2+Y3+Y4)/4$ of the Y component of the top four pixels P1 to P4 as the first representative value Yr1. The representative-value determiner 111 also determines an average value $(Y5+Y6+Y7+Y8)/4$ of the Y component of the bottom four pixels P5 to P8 as the second representative value Yr2. Similarly, the representative-value determiner 111 determines the first representative value Ur1 $(=(U1+U2+U3+U4)/4)$ and the second representative value Ur2 $(=(U5+U6+U7+U8)/4)$ of the U component.

Next, the image-component determiner 112 compares magnitudes of differences between the two representative values of the respective image components to determine each image component as either the reference component or the non-reference component (S2). The image-component determiner 112 determines the reference component and the non-reference components in accordance with the following procedure S21 to S26, for example.

In a case where the following condition (A) is satisfied, the Y component is determined as the reference component and the U and V components are determined as the non-reference components (S21).

$|Ur1-Ur2|<|Yr1-Yr2|$ and $|Vr1-Vr2|<|Yr1-Yr2| \quad (A)$

In a case where the condition (A) is not satisfied and a condition (B) is satisfied, the U component is determined as the reference component and the Y and V components are determined as the non-reference components (S22).

$|Ur1-Ur2|>|Yr1-Yr2|$ and $|Vr1-Vr2|>|Yr1-Yr2|$ and $|Ur1-Ur2|>|Vr1-Vr2| \quad (B)$ In a case where the condition (B) is not satisfied and a condition (C) is satisfied, the V component is determined as the reference component and the Y and U components are determined as the non-reference components (S23).

$|Ur1-Ur2|>|Yr1-Yr2|$ and $|Vr1-Vr2|>|Yr1-Yr2|$ and $|Ur1-Ur2|<|Vr1-Vr2| \quad (C)$ In a case where the condition (C) is not satisfied and a condition (D) is satisfied, the U component is determined as the reference component and the Y and V components are determined as the non-reference components (S24).

$|Ur1-Ur2|>|Yr1-Yr2|$ and $|Vr1-Vr2|<|Yr1-Yr2| \quad (D)$

In a case where the condition (D) is not satisfied and a condition (E) is satisfied, the V component is determined as the reference component and the Y and U components are determined as the non-reference components (S25).

$|Ur1-Ur2|<|Yr1-Yr2|$ and $|Vr1-Vr2|>|Yr1-Yr2| \quad (E)$

In a case where the condition (E) is not satisfied, the Y component is determined as the reference component (S26).

Subsequently, the slope determiner 113 determines a slope "a" of a linear line predicting each of the non-reference components from the reference component (S3). For example, in a case where the reference component is the Y component, determination of slopes $a_{U(Y)}$ and $a_{V(Y)}$ predicting the U and V components is performed in accordance with Equations (1) and (2) already described, respectively.

If a slope is determined by a least-square method, the amount of calculation is excessively large and it is difficult to determine the slope simply and rapidly. In contrast, in the present embodiment, it is possible to determine the slope "a" simply and rapidly based on the differences between the two representative values.

Subsequently, the compressor 114 compresses the value Cr of the reference component of each pixel in the input image data Iin, the slope "a", and the representative value Cn of each of the non-reference components to generate a compressed image data (S4). The compressor 114 then outputs the compressed image data Ic.

Subsequently, the expander 121 expands the compressed image data Ic (S5). By this expansion, the expander 121 acquires the value Cr of the reference component of each pixel, the slope "a", and the representative value Cn of each of the non-reference components. Next, the reference-component representative-value determiner 122 determines a representative value Cr1/Cr2 of the reference component (S6).

Next, the intercept determiner 123 determines an intercept b of the linear line based on the slope "a", the representative value Cn of each of the non-reference components, and the representative value Cr1/Cr2 of the reference component (S7). Subsequently, the predictor 124 predicts each of the non-reference components based on the value Cr of the reference component, the slope "a", and the intercept b (S8).

With the image transfer system 1 according to the present embodiment, it is possible to set the slope of the linear line to be equal to or smaller than 1 by using an image component for which the difference between the two representative values is the largest as the reference component. Therefore, the code amount required for compression can be suppressed. Further, with the image transfer system 1, the code amount required for compression can be further suppressed by compressing the representative value of each of the non-reference components instead of the intercept. Therefore, according to the present embodiment, the code amount required for compression of the linear equations predicting the image components (the non-reference components) can be reduced.

The present embodiment is also applicable to an input image data including pixels each being formed by R, G, and B components. At least a part of the image transfer system according to the present embodiment may be formed by hardware or software. In the latter case, a program that can achieve at least a part of the functions of the image transfer system 1 may be stored in a recording medium such as a flexible disk or a CD-ROM, and the program is read into a computer and is executed by the computer. The recording medium is not limited to a removable medium such as a magnetic disk or an optical disk, but may be a fixed recording medium such as a hard disk device or a memory. Further, the program that can achieve at least a part of the functions of the image transfer system may be distributed via a communication line (including wireless communication) such as the Internet. In addition, the program can be distributed via a wired line or a wireless line such as the Internet in a state where the program is encrypted, modulated, or compressed, or can be distributed as the program stored in a recording medium.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An image compression apparatus comprising:
   a slope determiner determining slopes of linear lines calculated from a reference component and non-reference components, the reference component being one of a plurality of image components forming pixels included in an input image data, and the non-reference components being other image components;
   a compressor generating a compressed image data in which a value of the reference component of each of the pixels in the input image data, the slopes, and representative values of the non-reference components are compressed;
   an image-component determiner determining one of the image components as the reference component and other image components as the non-reference components based on the input image data; and
   a representative-value determiner determining two representative values of each of the image components based on values of each of the image components of the pixels,
   wherein the representative-value determiner determines an average value of each of the image components corresponding to a predetermined number of ones of the pixels in the input image data, counted from one of the pixels having a smallest value of the image component, and an average value of each of the image components corresponding to a predetermined number of ones of the pixels in the input image data, counted from one of the pixels having a largest value of the image component, as the two representative values.

2. The apparatus of claim 1, wherein the image-component determiner calculates differences of the image components between two pixels and determines one of the image components for which the difference is largest as the reference component.

3. The apparatus of claim 1, wherein the slope determiner determines a value obtained by dividing a value based on a difference between the two representative values of each of the non-reference components by a difference of the two representative values of the reference component, as the slope.

4. The apparatus of claim 3, wherein the slope is equal to or less than 1.

5. The apparatus of claim 1, wherein the compressor codes the value of the reference component of each of the pixels, the slopes, and the representative values of the non-reference components with a fixed length.

6. An image expansion apparatus comprising:
   an expander expanding a compressed image data including values of a reference component forming pixels, slopes of linear lines, and representative values of non-reference components;
   an intercept determiner determining intercepts of the linear lines based on the slopes and the representative values of the non-reference components, respectively; and
   a predictor predicting the non-reference components based on the values of the reference component, the slopes, and the intercepts, respectively.

7. The apparatus of claim 6, further comprising a reference-component representative-value determiner determining a representative value of the reference component based on the values of the reference component, wherein the intercept determiner determines the intercepts based on the slopes, the representative value of the reference component, and the representative values of the non-reference components, respectively.

8. The apparatus of claim 7, wherein the reference-component representative-value determiner determines an average value of the reference component of a predetermined number of ones of the pixels, counted from one of the pixels having a smallest or largest value of the reference component, as the representative value of the reference component.

9. An image transfer system comprising:
an image compression apparatus; and
an image expansion apparatus,
wherein:
the image compression apparatus includes:
an image-component determiner determining, based on an input image data including pixels each formed by a plurality of image components, one of the image components as a reference component and other image components as non-reference components,
a slope determiner determining slopes of linear lines calculated from the reference component and the non-reference components, respectively, and
a compressor generating a compressed image data in which a value of the reference component of each of the pixels in the input image data, the slopes, and representative values of the non-reference components are compressed, and
the image expansion apparatus includes:
an expander expanding the compressed image data,
an intercept determiner determining intercepts of the linear lines based on the slopes and the representative values of the non-reference components that are included in the compressed image data, respectively, and
a predictor predicting the non-reference components based on the values of the reference component and the slopes that are included in the compressed image data, and the intercepts, respectively.

10. The system of claim 9, wherein the image-component determiner calculates differences of the image components between two pixels and determines one of the image components for which the difference is largest as the reference component.

11. The system of claim 9, wherein the image compression apparatus further comprises a representative-value determiner determining two representative values based on values of each of the image components of the pixels.

12. The system of claim 11, wherein the representative-value determiner determines an average value of each of the image components corresponding to a predetermined number of ones of the pixels in the input image data, counted from one of the pixels having a smallest value of the image component, and an average value of each of the image components corresponding to a predetermined number of ones of the pixels in the input image data, counted from one of the pixels having a largest value of the image component, as the two representative values.

13. The system of claim 11, wherein the slope determiner determines a value obtained by dividing a value based on a difference between the two representative values of each of the non-reference components by a difference of the two representative values of the reference component, as the slope.

14. The system of claim 13, wherein the slope is equal to or less than 1.

15. The system of claim 9, wherein the compressor codes the value of the reference component of each of the pixels, the slopes, and the representative values of the non-reference components with a fixed length.

16. The system of claim 9, wherein:
the image expansion apparatus comprises a reference-component representative-value determiner determining a representative value of the reference component based on the values of the reference component, and
the intercept determiner determines the intercepts based on the slopes, the representative value of the reference component, and the representative values of the non-reference components, respectively.

17. The system of claim 16, wherein the reference-component representative-value determiner determines an average value of the reference component of a predetermined number of ones of the pixels, counted from one of the pixels having a smallest or largest value of the reference component, as the representative value of the reference component.

* * * * *